United States Patent
Thomas

(10) Patent No.: US 6,391,098 B1
(45) Date of Patent: May 21, 2002

(54) AIR BRAKING SYSTEM COMPONENT

(75) Inventor: Barry David Thomas, Bradford (GB)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/269,083

(22) PCT Filed: Sep. 18, 1997

(86) PCT No.: PCT/GB97/02528

§ 371 Date: Jun. 17, 1999

§ 102(e) Date: Jun. 17, 1999

(87) PCT Pub. No.: WO98/12089

PCT Pub. Date: Mar. 26, 1998

(30) Foreign Application Priority Data

Sep. 19, 1996 (GB) .............................................. 9619535

(51) Int. Cl.[7] .......................... B01D 53/04; B01D 53/26
(52) U.S. Cl. .............................. 96/111; 96/113; 96/115; 96/130; 96/144; 96/147; 55/DIG. 17
(58) Field of Search ....................... 55/DIG. 17; 96/111, 96/113–115, 130, 143, 144, 147

(56) References Cited

U.S. PATENT DOCUMENTS

| 3,080,693 A | * | 3/1963 | Glass et al. .................... 96/113 |
| 3,242,650 A | * | 3/1966 | Crawford ....................... 96/113 |
| 3,464,186 A | * | 9/1969 | Hankinson et al. ............ 96/115 |
| 3,472,000 A | * | 10/1969 | Glass et al. .................... 96/113 |
| 3,592,563 A | * | 7/1971 | Glass et al. ............... 96/113 X |
| 3,714,763 A | | 2/1973 | Suzuki ........................... 55/63 |
| 3,923,479 A | * | 12/1975 | Glass et al. .................... 96/114 |
| 4,549,888 A | * | 10/1985 | Fannin ......................... 96/113 |
| 4,714,483 A | * | 12/1987 | Koening et al. .............. 96/113 |
| 4,892,569 A | | 1/1990 | Kojima ......................... 96/113 |
| 5,286,283 A | | 2/1994 | Goodell ........................ 96/113 |
| 5,423,129 A | | 6/1995 | Castle et al. ................... 34/80 |
| 5,458,677 A | | 10/1995 | VanderMolen ............... 96/113 |
| 5,917,139 A | * | 6/1999 | Goodell et al. ............... 96/113 |
| 6,074,462 A | * | 6/2000 | Quinn et al. .................. 96/113 |

FOREIGN PATENT DOCUMENTS

| EP | 0 350 215 | 1/1990 |
| GB | 2 163 366 | 2/1986 |

* cited by examiner

Primary Examiner—Robert H. Spitzer

(57) ABSTRACT

An air dryer for a vehicle air braking system comprises a container having first, second and third compartments, the first compartment having an upstream inlet for connection to a source of air under pressure, a vent for connection to the exterior of the container and a desiccant therein, the second compartment including a chamber having an inlet downstream of the first compartment with a non-return valve therein, a fluid connection to the first compartment having a restrictor therein, and the third compartment including a chamber having an inlet downstream of the second compartment with a non-return valve therein and an outlet for connection to a fluid pressure using device.

9 Claims, 6 Drawing Sheets

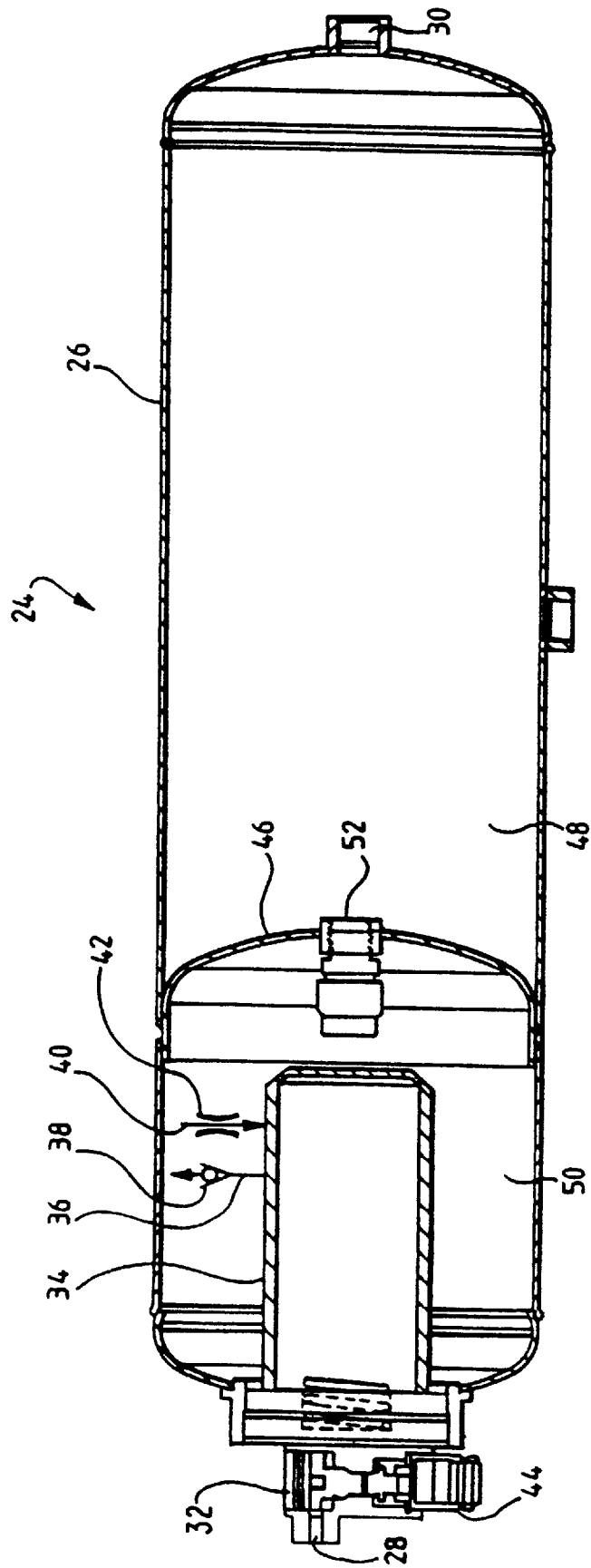

AIR BRAKING SYSTEM COMPONENT

This invention relates to a component for an air braking system, and particularly to a combined air dryer/reservoir for a vehicle air braking system.

Air braking systems are typically found on heavy commercial vehicles. They usually comprise a compressor, a demand valve, one or more reservoirs and plurality of actuators for the vehicle wheel brakes. One common addition to an air braking system is an air dryer. An air dryer typically comprises a canister of desiccant downstream of the compressor and through which air is passed to the system. In time, the desiccant becomes less effective, as moisture is adsorbed, and it is necessary to regenerate the desiccant for example by reverse flow of dry air and exhausting the resultant moist air through a vent valve to atmosphere. Regeneration for a single chamber reservoir is carried out when the compressor is off-load using dry air from the system volume or from a dedicated purge tank downstream of the air dryer. Alternatively, parallel air dryers can be provided where little off-load time is available; regeneration for either one of the air dryers is carried out when the compressor is on-load and connected through the other air dryer; dry air is supplied to the 'wet' air dryer from a secondary downstream reservoir.

Figure 1:
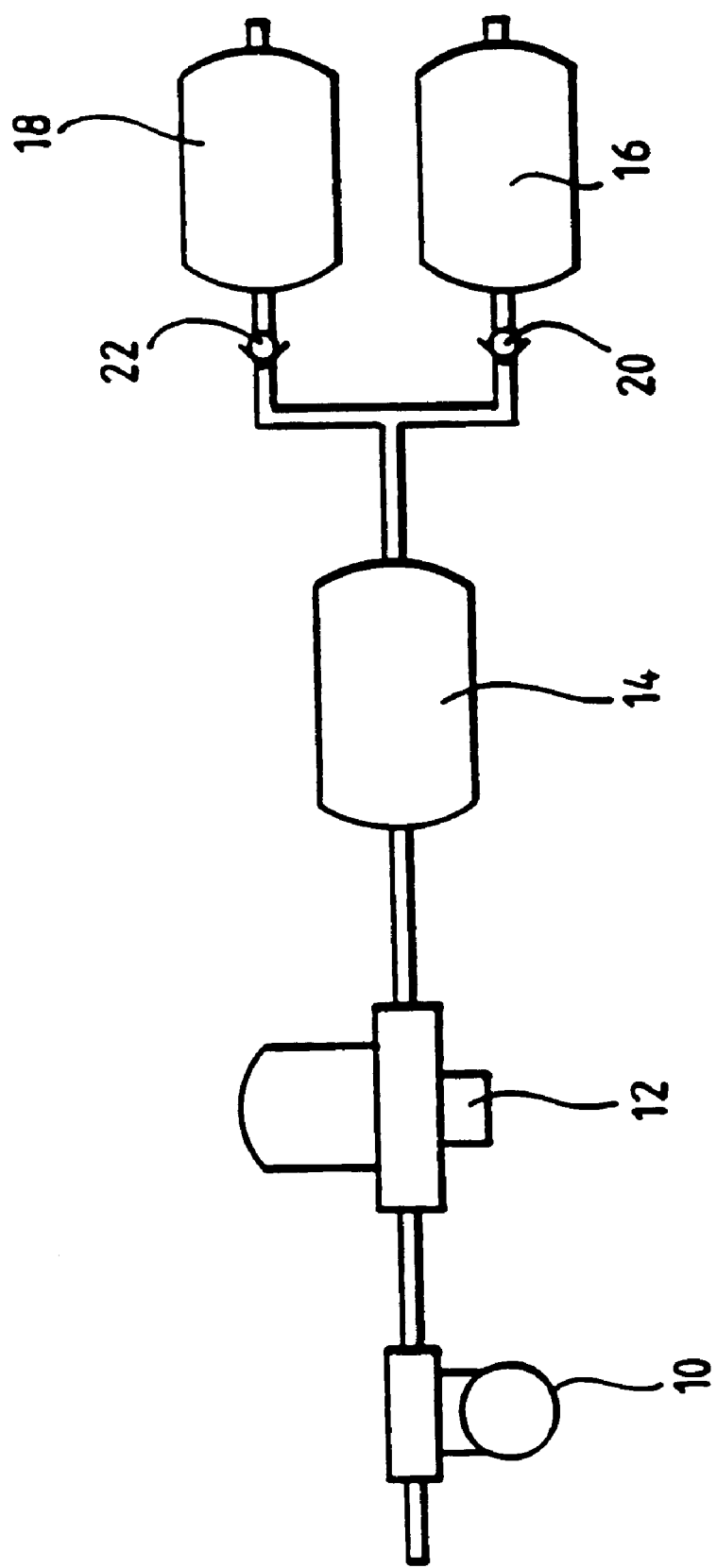

A typical air system lay out with a single air dryer is shown schematically in FIG. 1. The system comprises, in series, a compressor 10, an air dryer 12, a sensing tank 14 and reservoirs 16, 18 downstream of non-return valves 20,22 respectively. A pressure sensor in the tank 14 causes the compressor to be brought on load or off load according to the sensor state, and consequently to switch the air dryer inlet between pressure feed from the compressor and exhaust whereby dry air flows back through the desiccant chamber. The system shown requires rather a lot of piping to connect the individual components; it is not particularly compact and is consequently disadvantageous where space is limited.

It is an object of the invention to provide an improved component including air drying means for an air braking system.

Accordingly there is provided a component of an air braking system comprising a container having first and second compartments, the first compartment having an upstream inlet for connection to a source of air under pressure, a vent for connection to the exterior of the container and a desiccant therein, the second compartment comprising a chamber having a downstream inlet from the first compartment with non-return means therein, a return connection to the first compartment having a fluid restrictor therein, and an outlet for connection to an air braking system.

In that way the desiccant compartment is located next to the air reservoir constituted by the second compartment, which results in a much more compact system in which the external shape of the component can be adapted to the available space. The component of the invention is suitable for air braking systems in which the desiccant is regenerated when the compressor is off load but working and systems where the desiccant is regenerated whilst the compressor is deactivated. Furthermore the component of this invention can be used in systems which have significant compressor off load time, and systems where off load time is restricted and thus switching between alternative desiccant beds is required.

Preferably the component includes a control valve to regulate the passage of air through said upstream inlet and vent, and the control valve may be mounted to the container. The control valve may be controlled by a conventional demand valve signal such that regeneration of the desiccant is initiated at a suitable time.

In an alternative embodiment the component may include a third compartment having an upstream inlet for connection to a source of air under pressure, a vent for connection to the exterior of the container and a desiccant therein, the second compartment also having a downstream inlet from the third compartment with non-return means therein, and a return connection to the third compartment having a fluid restrictor therein. Preferably a control valve is provided to regulate the passage of air through the upstream inlet and vent of said third compartment. A common control valve may be provided to regulate the passage of air through said upstream inlets and vents of said first and third compartments. In that way air can be directed between the first and third compartments and thus permit a relatively wet desiccant compartment to be regenerated with dry air whilst air under pressure is supplied through the relatively dry desiccant compartment.

Preferably the control valve is adapted to selectively direct air to the upstream inlet of the first compartment and to the upstream inlet of the third compartment. The control valve may be adapted to direct air between said upstream inlets according to a timer, a sensing device adapted to monitor the degree of moisture in said first and third compartments, or any other suitable sensor.

Preferably the compartments are defined by a partition within the container and the first compartment may project into the second compartment. Where two desiccant chambers are provided, both may project into the air reservoir constituted by the second compartment.

There may be provided a further compartment comprising a chamber connected to the outlet of said second compartment, non-return means being provided at said outlet and said further compartment being provided with a supply connection to an air braking system. This arrangement places successive air reservoirs in series, the upstream reservoir constituting a relatively small reservoir for desiccant drying purposes, and the downstream reservoir constituting a main supply tank for the braking system.

The component is preferably modular, most preferably in the form of a canister for installation into an air braking system. In such a case the inlets and outlets may have appropriate pressure fittings. The component may for example be screw threaded onto a valve block in a manner similar to that of an oil filter.

The desiccant may be removable from the first and third compartments.

The invention also encompasses an air braking system, particularly a vehicle air braking system, having a component according to the invention.

Figure 2:
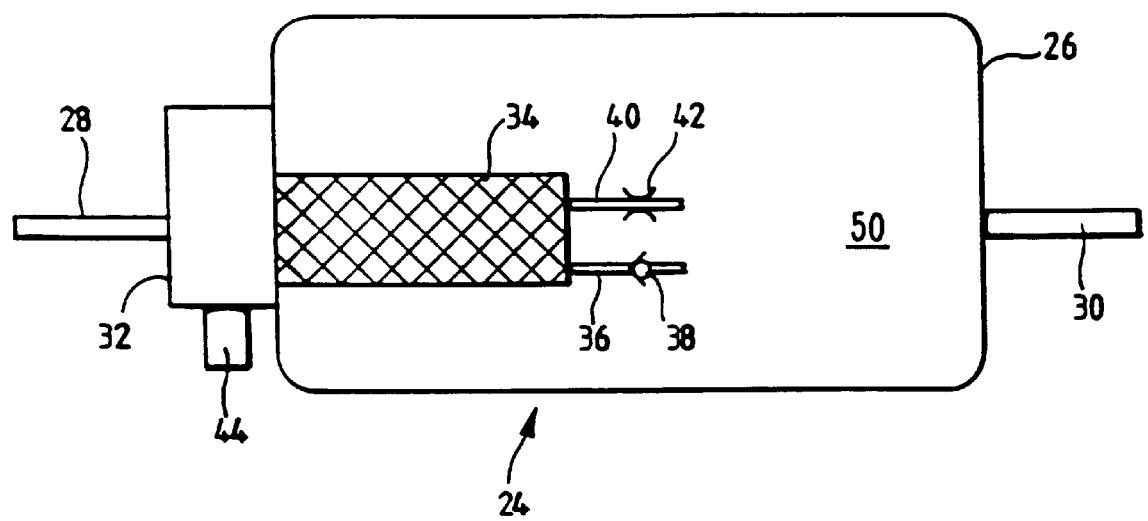
Figure 2A:
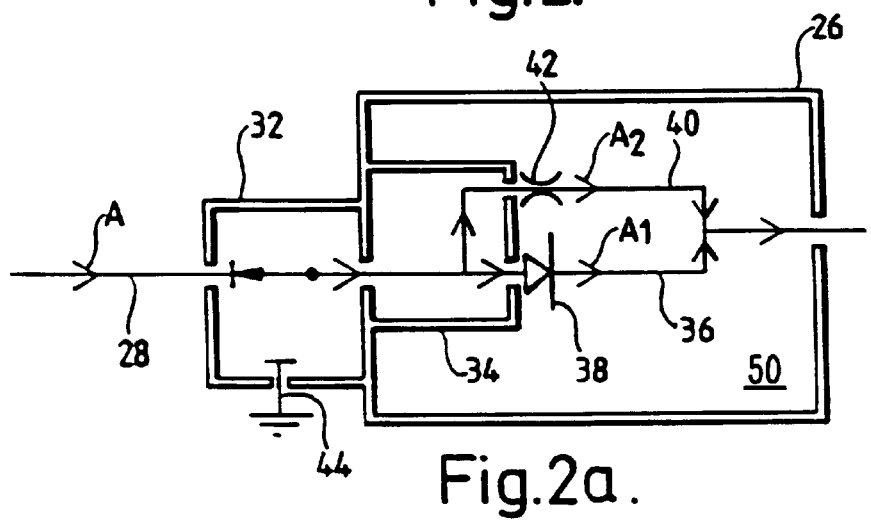
Figure 2B:
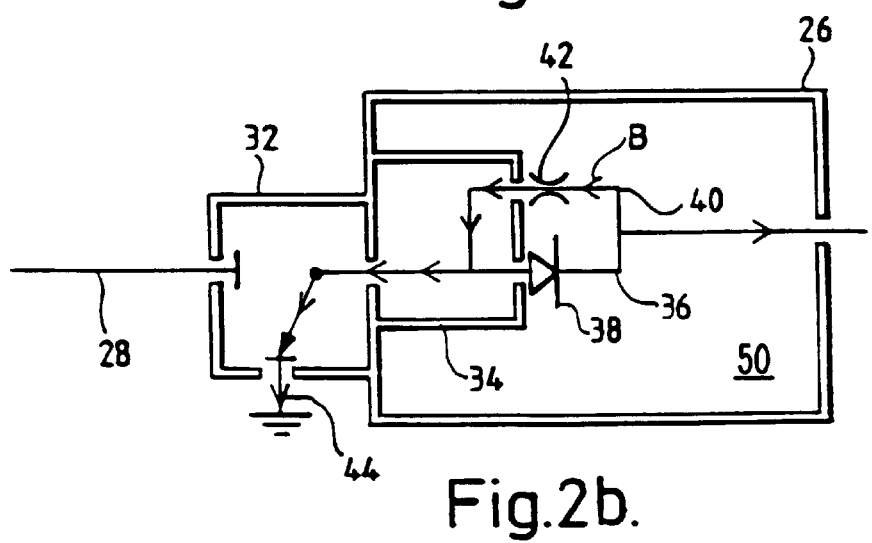
Figure 3:
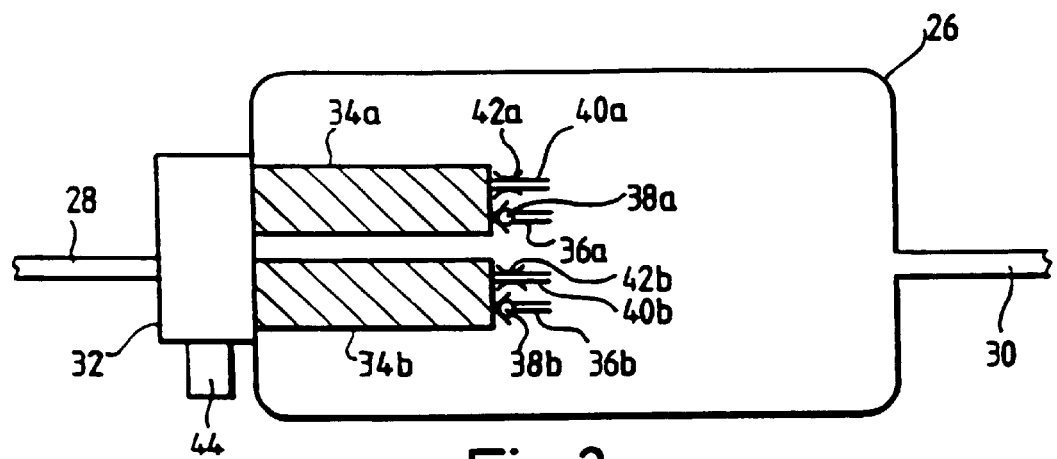
Figure 3A:
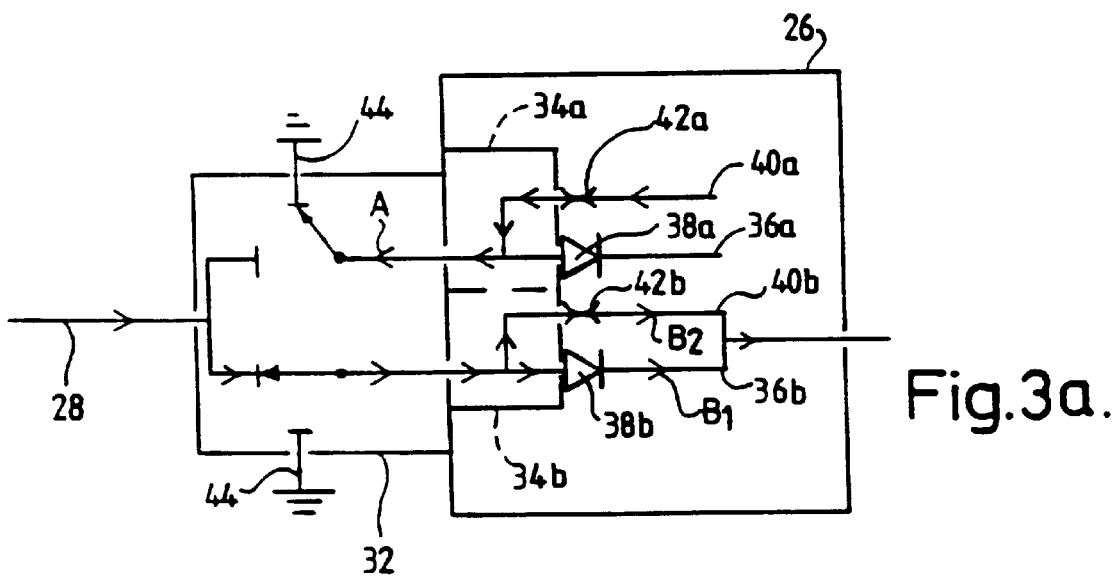
Figure 3B:
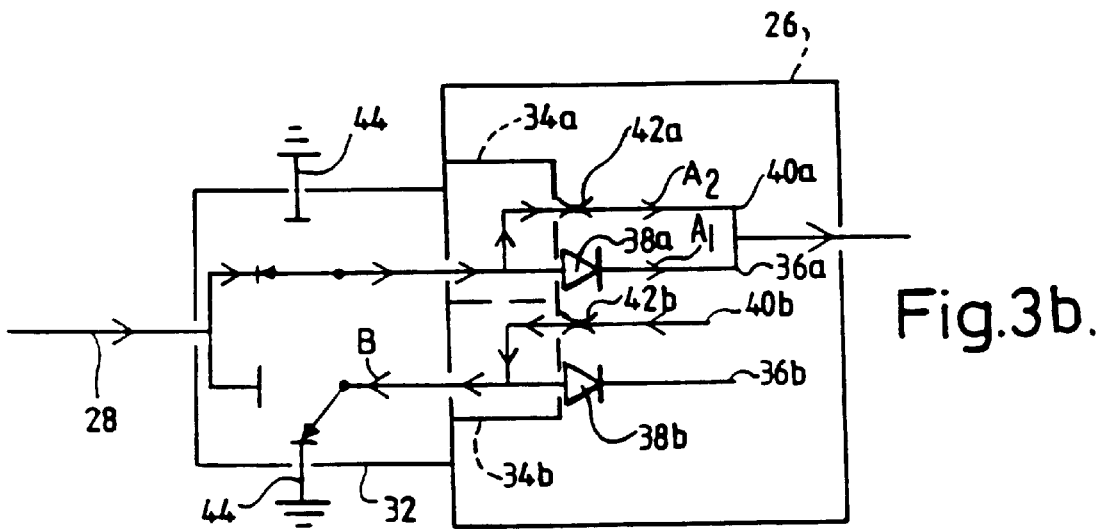
Figure 4A:
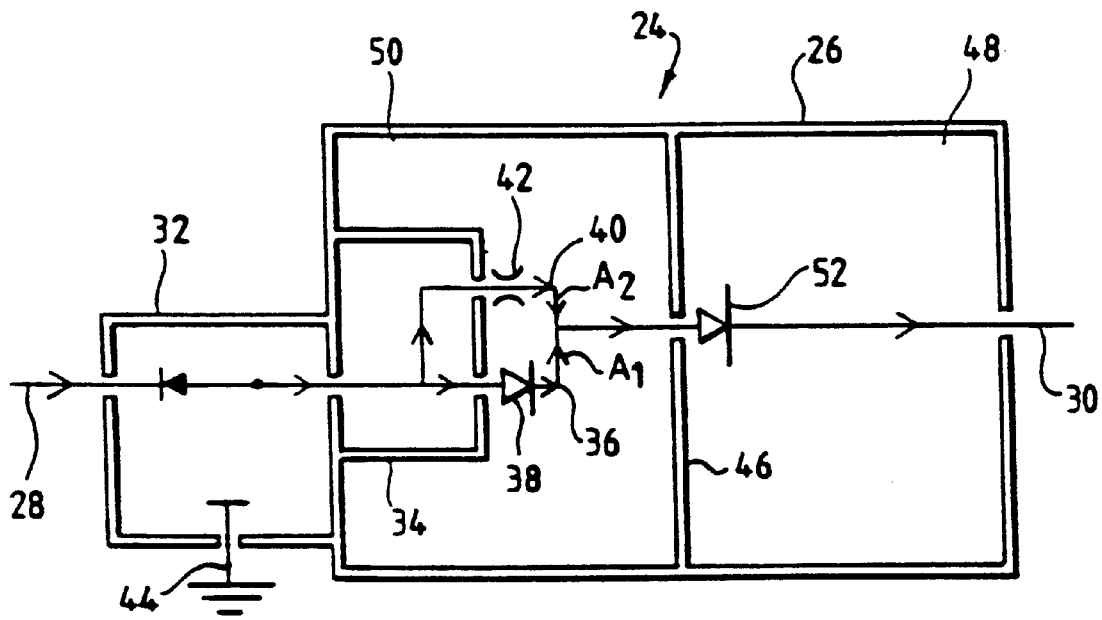
Figure 4B:
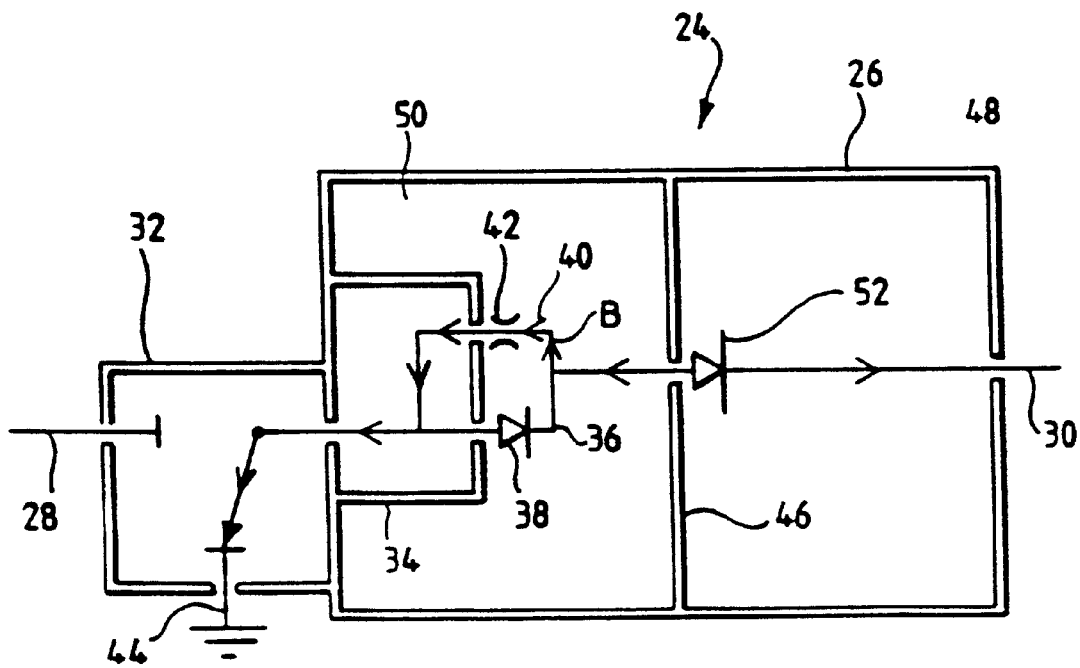
Figure 5:
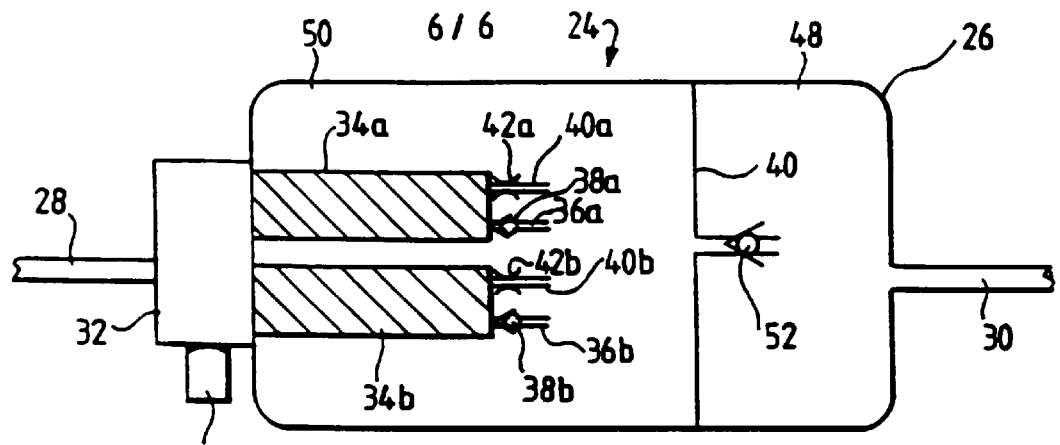
Figure 5A:
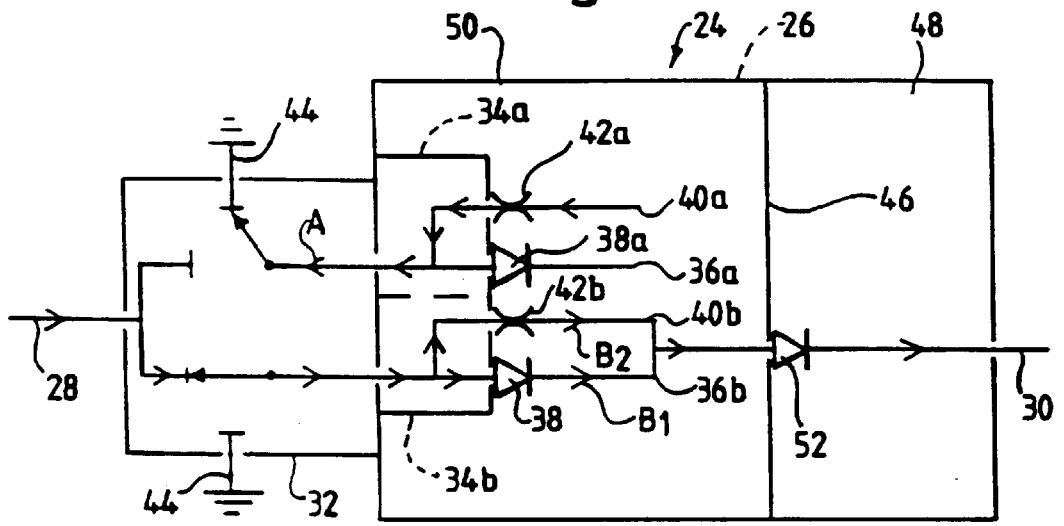
Figure 5B:
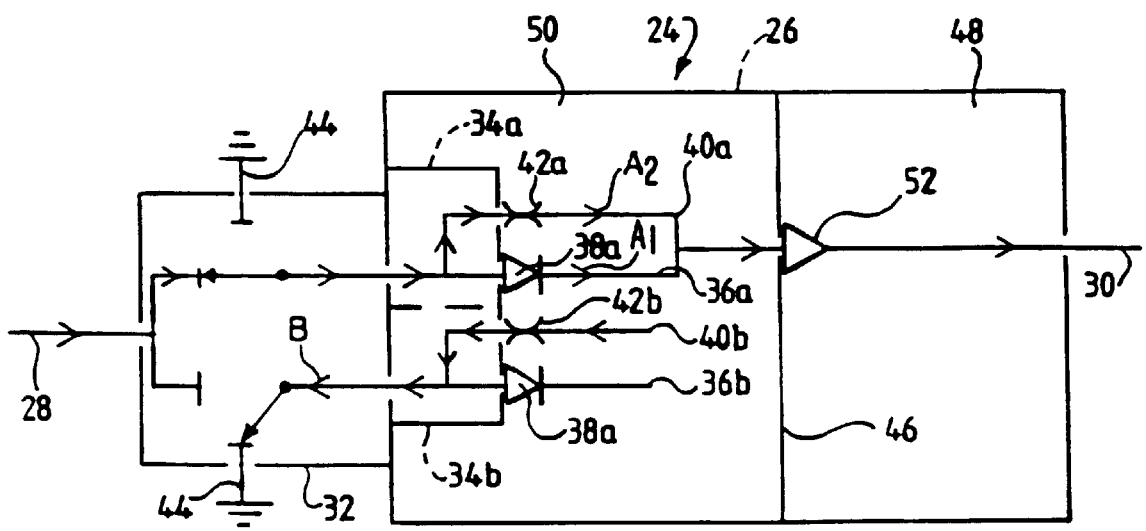

Embodiments of components in accordance with the invention will now be described in detail, by way of example, and with reference to the accompanying drawings, in which:

FIG. 1 is a schematic cross-section through a known air drying system, FIG. 2 is a schematic cross-section through a first component in accordance with the invention, FIGS. 2a and 2b are schematic representations of air flow through the component of FIG. 2 in drying and regenerating states respectively, FIG. 3 is a schematic cross-section through a second component in accordance with the invention, FIGS. 3a and 3b are schematic representations of air flow through the component of FIG. 3 showing drying of compartment 34a and 34b respectively, FIG. 4 is a longitudinal cross-section of a third component in accordance with the present invention, FIGS. 4a and 4b are schematic representations of air flow through the component of FIG. 4 in drying and regenerating states respectively, FIG. 5 is a schematic cross-section through a fourth component in accordance with the present invention, and FIGS. 5a and 5b are schematic representations of air flow through the component of FIG. 5 showing drying of compartments 34a and 34b respectively.

In FIG. 2, a component generally indicated at 24 comprises an airtight container 26 having an inlet 28 and an outlet 30. The inlet 28 is closed by a control valve 32. The outlet 30 is normally closed but is openable in use by a demand valve of an air braking system (not shown).

A desiccant compartment 34 is located downstream of the inlet 28 within the container 26. The desiccant compartment 34 constitutes the first compartment. A passageway 36 having a non-return valve 38 is arranged between the desiccant compartment 34 and the container 26. The non-return valve 38 is arranged whereby air can pass from the inlet 28 through the first compartment 34 and passageway 36 into the container 26 but not in the reverse direction. The desiccant compartment 34 also has a return passageway 40 with a restriction 42 therein. The interior of the container 26 downstream of the desiccant compartment 34 constitutes the second compartment 50 which is the air reservoir of the system. The outlet from the reservoir 26 may include a non-return valve (not shown).

The control valve 32 is switchable between an inlet path and an exhaust path. The inlet path permits air received from pipe 28 to pass into the container 26 via desiccant compartment 34. The exhaust path permits air to flow from compartment 34 to vent 44.

FIGS. 2a and 2b illustrate schematically the air flow through the valve and passageway arrangement shown in FIG. 2. FIG. 2a shows the air flow when the control valve is switched to the inlet path with air being dried by the desiccant and FIG. 2b shows the air flow when the control valve is switched to the exhaust path with the desiccant being regenerated.

In FIG. 2a an air flow A is illustrated flowing from the inlet pipe 28 through the control valve 32 and into the desiccant compartment 34. The air is dried by the desiccant in the compartment and split into two air flows A1 and A2. Air flow A1 has a much greater mass flow rate than air flow A2 as the air flow A1 is relatively unrestricted while A2 passes through the restrictor 42. Thus dry air accumulates in the container 26 for ultimate use in the air braking system.

FIG. 2b shows an air flow B when the component is in a desiccant regeneration state. In such a case, the control valve 32 is switched, for example by a timed control signal, from the inlet pipe 28 to the exhaust vent 44. The air in the container 26 is at a relatively high pressure in relation to ambient atmospheric pressure. Thus dry air B travels via passageway 40 and restrictor 42, through the desiccant compartment 34 and via control valve 32 to the vent 44. The non-return valve 38 prevents reverse flow via passageway 36.

Thus, the component is used to dry air from the inlet 28 and, when the compressor is off load, the control valve 32 can be switched to the vent 44 to allow some dry air from the container 26 to pass through the desiccant compartment 34 for regeneration of the desiccant therein. The restrictor 42 ensures controlled expansion of the pressurised air and effective regeneration. The size of the restrictor is selected to suit the regeneration parameters and is dependent on pressure, saturation volume and other factors which are governed by the system specification.

FIG. 3 shows an alternative form of a component in accordance with the invention. Parts in FIG. 3 corresponding to parts in FIG. 2 carry the same reference numerals.

The component of FIG. 3 is substantially similar to that shown in FIG. 2 except two desiccant compartments 34a, 34b with respective passages 36a, 36b and 40a, 40b are provided. As shown in FIGS. 3a and 3b the control valve 32 switches the air supply from inlet pipe 28 between the desiccant compartments 34a and 34b. The desiccant compartment 34a, 34b which is not being supplied with air from the inlet 28 can be connected to the exhaust vent 44. Thus, whilst one desiccant compartment dries the air being supplied to the container 26, part of the dry air in container 26 can be vented to atmosphere via the other desiccant compartment to dry the desiccant in that compartment.

The component of FIG. 3 is particularly useful where available off-load time for the system is limited.

FIG. 3a shows the air flow through the system when desiccant compartment 34a is vented to atmosphere. Air flows into the control valve 32 and is directed into the desiccant compartment 34b. The air flow splits into two air flows B1 and B2, as described previously in relation to FIG. 2, B1 travels along passageway 36b via the non-return valve 38b and B2 travels along the passageway 40b via the restrictor 42b. As the air in container 26 is pressurized relative to the ambient atmospheric pressure, an air flow A can be arranged to pass via the restrictor 42a in passageway 40a, through the desiccant compartment 34a to dry the desiccant and out via the exhaust vent 44 to atmosphere.

FIG. 3b illustrates the system when the desiccant compartment 34b is vented to atmosphere. In that case the air flow travels through the control valve 32 into desiccant compartment 34a and splits into air flows A1, A2. A1 travels, as described previously in relation to FIG. 2, along the passageway 36a via the non-return valve 38a and A2 travels along passageway 40a via the restrictor 42a. Again, the high pressure in container 26 is available to cause an air flow B to travel via passageway 40b through the restrictor 42b and desiccant compartment 34b, drying the desiccant. The moist air in air flow B is then vented to atmosphere via the exhaust vent 44.

It is clear that the system of FIG. 3 can be run continuously. When the desiccant bed in one of the compartments 34a, 34b becomes saturated or after a certain time period, the control valve 32 can switch so that the incoming air passes through the dry desiccant bed and the relatively wet desiccant bed is vented to atmosphere for regeneration. The control valve 32 may direct the air between the desiccant beds according to a timer, a sensing device adapted to monitor the degree of moisture in the desiccant beds,. or any other suitable sensor. Again the size of the restrictor is dependent on system parameters but it does not matter that air flows through the restrictor in both directions. What is important is that the majority of flow is via the non-return valve in the drying direction whilst all of the flow is via the restrictor in the regeneration direction.

Referring now to FIG. 4 there is shown a longitudinal cross-section of a third component 24 according to the present invention. The component 24 comprises an airtight container 26 having an inlet 28 and an outlet 30. The inlet is closed by a control valve 32. The outlet 30 is closable in use by a demand valve of an air braking system (not shown) and may incorporate a non-return valve. The airtight container 26 is provided with an internal partition 46 dividing the interior of the airtight container 26 into two chambers; a service chamber 48 and a purge chamber 50. The partition 46 is provided with a non-return valve 52 permitting fluid communication from the purge chamber 50 to the service chamber 48 but not in the reverse direction.

A desiccant compartment 34 is located downstream of the inlet 28 within the purge chamber 50. The desiccant compartment 34 constitutes a first compartment, the purge chamber 50 a second compartment, and the service chamber 48 a further compartment. A passageway 36 having a non-return valve 38 is arranged between the desiccant compartment 34 and the purge chamber 50. The non-return valve 38 is arranged whereby air can pass from the inlet 28 through the desiccant compartment 34 and into the purge chamber 50 but not in the reverse direction. The desiccant compartment 34 also has a second passageway 40 with a restriction 42 therein. The service chamber 48 downstream of the purge chamber 50 serves as the air reservoir for the air braking system. The outlet 30 from the service chamber 48 may include a non-return valve (not shown). The control valve 32 is switchable between an inlet path and an exhaust path. The inlet path permits air received from the inlet 28 to pass first into the purge chamber 50 via the desiccant compartment 34 and thereafter to the service chamber 48 via the check valve 52. The exhaust path permits air to flow from the desiccant compartment 34 to a vent 44.

FIGS. 4a and 4b illustrate schematically the air flow through the valve and passageway arrangement shown in FIG. 4. FIG. 4a shows the air flow when the control valve 32 is switched to the inlet path with the air being dried by the desiccant and FIG. 4b shows the air flow when the control valve 32 is switched to the exhaust path with the desiccant being regenerated.

The component of FIG. 4 operates in a manner substantially the same as that described above for the air dryer of FIGS. 2, 2a and 2b with the exception that air within the service chamber 48 cannot flow back through the desiccant compartment 34 when the control valve 32 is switched to the exhaust path.

The composite tank of FIG. 4 is readily constructed from cylinders of e.g. sheet metal and domed ends attached thereto by e.g. welding. It has good resistance to pressure deformation whilst being economical to construct and of compact dimensions.

FIG. 5 shows an alternative form of a component in accordance with the invention. Parts in FIG. 5 corresponding to parts in FIG. 4 carry the same reference numerals.

The component of FIG. 5 is substantially similar to that shown in FIG. 4 except two desiccant compartments 34a, 34b with respective passages 36a, 36b and 40a, 40b are provided. As shown in FIGS. 5a and 5b the control valve 32 switches the air supply from inlet pipe 28 between the desiccant compartments 34a and 34b. The desiccant compartment 34a, 34b which is not being supplied with air from the inlet 28 can be connected to the exhaust vent 44. Thus, whilst one desiccant compartment dries the air being supplied to the container 26, part of the dry air in container 26 can be vented to atmosphere via the other desiccant compartment to dry the desiccant in that compartment.

The component of FIG. 5 is particularly useful where available off-load time for the system is limited.

The component of FIG. 5, operates in a manner substantially the same as that described above for the component of FIGS. 3, 3a and 3b with the exception that air within the service chamber 48 cannot flow back through the desiccant compartments 34a, 34b when the control valve is switched to the exhaust paths.

It is clear that the system of FIG. 5 can be run continuously. When the desiccant bed in one of the compartments 34a, 34b becomes saturated or after a certain time period, the control valve 32 can switch so that the incoming air passes through the dry desiccant bed and the relatively wet desiccant bed is vented to atmosphere for regeneration. Again the size of the restrictor is dependent on system parameters but it does not matter that air flows through the restrictor in both directions. What is important is that the majority of flow is via the non-return valve in the drying direction whilst all of the flow is via the restrictor in the regeneration direction.

The control valve 32 in any of the foregoing embodiments can be designed to suit either "line unload" or "governor controlled" air braking systems. In "line unload" systems, when the compressor is in the off-load state, the compressor continues to work but the air is vented to atmosphere. In a "governor controlled" system, when the compressor is in the off-load state, the compressor is deactivated and no longer delivers air.

The present system as set out in FIG. 2, 3, 4 or 5 provides a combined air dryer/reservoir component with reduced external piping. That, in turn, allows the system to be fitted on smaller vehicles or on vehicles with restricted space in their engine compartment. The reduction in external piping eliminates possible leak sites at the interface between piping and system components. Furthermore the compact nature of the air dryer/reservoir allows the unit to be satisfactorily tested before installation.

What is claimed is:

1. A reservoir assembly of an air braking system comprising a container having first, second and third compartments, the first and third compartments having an upstream inlet for connection to a source of air under pressure, a vent for connection to the exterior of the container and a desiccant therein, the second compartment comprising a chamber having downstream inlets from the first and third compartments with non-return means therein, return connections to the first and third compartments having fluid restrictors therein, and an outlet, said assembly further comprising a compartment having an inlet connected to said outlet and containing non-return means and a supply port for connection to an air braking system, all of said compartments being defined by partitions of the assembly.

2. An assembly as claimed in claim 1 and further including a control valve to regulate the passage of air through the upstream inlets and vents of said first and third compartments, said control valve being mounted to the assembly, and being adapted to selectively direct air to the upstream inlet of the first compartment and to the upstream inlet of the third compartment.

3. An assembly as claimed in claim 2 wherein the control valve is adapted to direct air between said upstream inlets according to a timer.

4. An assembly as claimed in claim 3 wherein the control valve is adapted to direct air between said upstream inlets according to a sensing device adapted to monitor the degree of moisture in said first and third compartments.

5. An assembly as claimed in claim 4 wherein one of the first and third compartments projects into the second compartment.

6. An assembly as claimed in claim 5 wherein the first and third compartments both project into the second compartment.

7. An assembly according to claim 6 wherein the second compartment and one of the first and third compartments have a common end wall.

8. An assembly according to claim 7 wherein the first, second and third compartments have a common end wall.

9. An air supply system for a heavy motor vehicle brake system, comprising:

a compressor for supplying compressed air;

an air dryer connected to receive compressed air from said air compressor including a desiccant bed through which the compressed air can flow to provide a clean and dry compressed air source for operating the brake system;

a secondary reservoir;

a housing connecting said air dryer and said secondary reservoir together as a unitary module;

a primary reservoir located away from said secondary reservoir;

control components disposed in said housing for controlling air flow from said air compressor through said air dryer for charging said primary reservoir and said secondary reservoir with compressed air;

a purge volume formed integral with said secondary reservoir;

a check valve forming an internal connection between said purge volume and said secondary reservoir; and said control components also control air flow from said purge volume through said air dryer desiccant bed to atmosphere to purge said air dryer.

* * * * *